(12) United States Patent
Papagrigoriou

(10) Patent No.: US 9,152,831 B2
(45) Date of Patent: Oct. 6, 2015

(54) SMART CARD READER WITH SPACE-SAVING AND COMBINED USER-SPECIFIC DATA INPUT AND OUTPUT

(71) Applicant: Paschalis Papagrigoriou, Nuremberg (DE)

(72) Inventor: Paschalis Papagrigoriou, Nuremberg (DE)

( * ) Notice: Subject to any disclaimer, the term of this patent is extended or adjusted under 35 U.S.C. 154(b) by 0 days.

(21) Appl. No.: 14/096,299

(22) Filed: Dec. 4, 2013

(65) Prior Publication Data

US 2014/0151451 A1 Jun. 5, 2014

(30) Foreign Application Priority Data

Dec. 4, 2012 (DE) ..................... 20 2012 104 705 U

(51) Int. Cl.
*G06F 17/00* (2006.01)
*G06K 7/01* (2006.01)
*G06K 7/00* (2006.01)
*G06F 3/0481* (2013.01)
*G06F 3/0488* (2013.01)

(52) U.S. Cl.
CPC ................ *G06K 7/01* (2013.01); *G06F 3/0481* (2013.01); *G06F 3/04886* (2013.01); *G06K 7/0065* (2013.01); *G06F 2203/04803* (2013.01)

(58) Field of Classification Search
CPC ..... G06F 3/04886; G06F 21/31; G06F 21/84; G06F 3/0488; G06F 3/0489; G07F 7/1008; G07F 7/1025; G07F 7/1033; G07F 7/1041; G07F 7/1066; G07F 9/023
See application file for complete search history.

(56) References Cited

U.S. PATENT DOCUMENTS

| 5,936,614 | A  | * | 8/1999 | An et al. ........................ 345/173 |
| 6,193,152 | B1 | * | 2/2001 | Fernando et al. ............. 235/380 |
| 6,644,547 | B1 | * | 11/2003 | White ............................ 235/381 |
| 8,042,733 | B2 | * | 10/2011 | Smith et al. .................... 235/379 |
| 8,255,323 | B1 | * | 8/2012 | Casey et al. ..................... 705/39 |
| 8,714,448 | B2 | * | 5/2014 | Lutz ............................... 235/380 |
| 2003/0132294 | A1 | | 7/2003 | Gomez et al. |
| 2004/0050933 | A1 | | 3/2004 | Keronen et al. |
| 2007/0067634 | A1 | * | 3/2007 | Siegler ........................... 713/171 |
| 2007/0215695 | A1 | * | 9/2007 | Trane ............................. 235/380 |
| 2008/0098464 | A1 | * | 4/2008 | Mizrah ............................ 726/5 |
| 2009/0199006 | A1 | | 8/2009 | Stohn |
| 2010/0042946 | A1 | * | 2/2010 | Kodimer et al. ............... 715/773 |
| 2011/0112918 | A1 | * | 5/2011 | Mestre et al. .................... 705/16 |
| 2011/0167375 | A1 | * | 7/2011 | Kocienda ....................... 715/773 |
| 2011/0185319 | A1 | * | 7/2011 | Carapelli ....................... 715/863 |

(Continued)

FOREIGN PATENT DOCUMENTS

| DE | 10 2008 050 441 | 4/2010 |
| EP | 2 088 531 | 1/2009 |
| EP | 2 458 526 | 11/2010 |
| WO | 0062523 | 10/2000 |

OTHER PUBLICATIONS

German Search Report of Feb. 9, 2013.

(Continued)

*Primary Examiner* — Thien M Le
*Assistant Examiner* — Claude J Brown
(74) *Attorney, Agent, or Firm* — Gerald E. Hespos; Michael J. Porco; Matthew T. Hespos

(57) ABSTRACT

A smart card reader for controlling a chip card comprising at least one display and a keyboard characterised by the implementation of both the display and the keyboard with a single touch-sensitive screen.

6 Claims, 3 Drawing Sheets

(56) References Cited

U.S. PATENT DOCUMENTS

| | | |
|---|---|---|
| 2011/0221678 A1* | 9/2011 | Davydov .................... 345/168 |
| 2012/0206363 A1* | 8/2012 | Kyprianou et al. .......... 345/168 |
| 2012/0265628 A1* | 10/2012 | Jacobs ........................ 705/23 |
| 2013/0144792 A1* | 6/2013 | Nilsson et al. .............. 705/67 |
| 2013/0234942 A1* | 9/2013 | Yoo et al. ................... 345/168 |

OTHER PUBLICATIONS

European Patent Application No. 13 19 5538.7—Search Report issued Feb. 10, 2015.

* cited by examiner

SMART CARD READER WITH SPACE-SAVING AND COMBINED USER-SPECIFIC DATA INPUT AND OUTPUT

BACKGROUND

1. Field of the Invention.

The invention relates to a device for the signature-based protection of electronic transactions which are executed in particular by banking applications on personal mobile terminals or other money or payment systems (e.g. POS—point of sale) and require the integrity of the digitally signed information and the identification of the originator of this information to be beyond doubt.

2. Description of the Related Art.

Electronic signatures are always used when there is a requirement to identify the originator or sender of an electronic document or data record beyond doubt and to guarantee the integrity of the signed electronic information. One example of a security-critical area which is becoming increasing important in everyday life is banking applications such as home banking or mobile banking. It is immediately apparent what might happen if a malicious third party could pretend to be the owner of a bank account that does not belong to him.

With the use of mobile systems in both private and commercial areas and in the fields of health or public administration, the risks resulting therefrom multiply if the integrity of the information transmitted cannot be guaranteed or if the identity of the originator cannot be established beyond doubt.

Depending upon the required level of security and the preferred security procedure, smart cards are used in combination with a smart card reader.

The relevant procedures, with reference to which the prior art will be described in the following, originate from the fields of security in payment transactions, online-banking security and chip technology. The sheer number of security procedures on the Internet, which have been developed in the last ten years, shows how important it is to guarantee the security and reliability of communication on the Internet. Procedures which are based on the use of TAN lists to safeguard a transaction are now no longer considered to be secure and have been superseded by other procedures.

The chip card is now at the centre of all security procedures to be taken seriously. It is considered to be a technically secure carrier of secret encoded information, it is always held by the customer (owned component) and also now represents a valuable and secure medium for all users of which they take particular care and the loss of which they report immediately to the issuer (for example, the bank). For example, a credit institution can always be confident that the chip card is with its customer and that this is actually the person carrying out the transactions because the loss of the chip card would be reported immediately. A synonym for the term chip card is smart card. The latter is also used in this document in particular when this relates to the crypto microcontroller of a chip card, the actual building block for cryptographic operations.

The majority of smart card based security procedures require a smart card reader. Due to current standards and in cases where a high level of security is to be achieved, card readers of this kind nowadays have a display and a separate keyboard unit.

Smart card readers are devices which control chip cards. In this case, data are not only read, they are also written or applications are controlled on the chip card; for this reason, they are also referred to as smart card terminals [1]. There are four security classes for smart card readers specified at the DK (German banking industry). Security classes 1 and 2 are of no interest for a serious security level. Smart card readers of security class 3 have a display and a keyboard and additional functions which enable payment with the money card on the internet. In addition to the features of class 3, smart card readers of security class 4 also have their own tamper-proof identity. This is enabled by means of an additional chip card. If a smart card reader is connected to a PC via USB or a serial interface, it is recognised by proprietary or standardised software interfaces and can communicate with an application. The present standard for interfaces of this kind is PC/SC [3], for which there are both Windows and Linux implementations. The Secoder specification [2] goes beyond the features of security class 3. A smart card reader built according to this specification includes a firewall, which protects against possible manipulation while the device interacts with the user via the display and keyboard (for example PIN entry) or processes data for the signature process with a chip card. In addition, standards, such as the Secoder standard require increasingly more information to be visible to users on the screen of the smart card reader before they release the transaction via the keyboards.

Despite rapid and exemplary developments in the field of mobile terminals (smartphones, tablets, etc.), adaptation of smart card readers could not keep pace appropriately. For example, in practice, present-day devices, which are also used in combination with mobile terminals, have more or less serious disadvantages with respect to handling or operation thus rendering them unsuitable for widespread use. The smart card reader is a mandatory further device for users that they must always have with them when there is a requirement for security-critical communications (for example mobile banking). To enable present-day smart card readers to fulfil all requirements of security standards and mobile communication, they either have large dimensions or are compact and space-saving, but then they only have tiny keys and displays.

SUMMARY OF THE INVENTION in contrast to the prior art, the solution according to the invention not only meets the highest security requirements, it is also able to organise the information output and information input during a transaction by means of a dynamic arrangement of the area of the touch-sensitive screen in an optimal and user-friendly manner.

In particular, the invention relates to a smart card reader for controlling chip cards comprising at least a display and a keyboard, wherein both the keyboard functions and the keyboard functions are provided by a single touch-sensitive screen.

In a further embodiment, the combination of display and keyboard implemented via a touch-sensitive screen is embodied such that both the information output required according to a smart card reader standard and during a transaction via a display and the information input required according to a smart card reader standard and during a transaction via a keyboard are equally possible in that, with constant dimensions of the touch-sensitive screen used, the ratio between the area required for the information output and the area required for the information input are changed dynamically depending upon whether either the display function or the keyboard function is to the fore for the currently pending transaction or the currently pending dialog step. If a larger area is required for an information output on the touch-sensitive screen, the number of keys displayed on the touch-sensitive screen is reduced accordingly, and if, vice versa, a larger number of keys is required for the information input for the currently pending transaction or the currently pending dialog step, the area of the touch-sensitive screen for the information output is reduced accordingly.

In a further embodiment, the dynamic partitioning of the touch-sensitive screen into regions for information output and information input can also take place several times during the course of a transaction.

In a further embodiment, the device according to the invention includes one or more display units, at least one of which is implemented via the touch-sensitive screen.

In a further embodiment, the device according to the invention includes one or more keyboard units, at least one of which is implemented via the touch-sensitive screen.

In a further embodiment, the device according to the invention includes one or more touch-sensitive screens.

The advantages of the device according to the invention lie in the optimal layout of the touch-sensitive screen enabling all the necessary functions to be implemented on a small area. If a smart card reader is implemented in conformity with one of the usual security standards (for example Secoder 2 in Germany [2], POS-Point-of-Sales Terminal [4]) and, during its use, an input by the user via a large number of keys is required in a transaction, such as, for example the numerical keys with some function keys in order to enter the PIN, the area available on the touch-sensitive screen for the information output will only be able to display one or maximum two display lines with (for example) 16 characters each. If a smart card reader is implemented in conformity with one of the usual security standards (for example Secoder 2 in Germany [2], POS-Point-of-Sales Terminal [4]) and, during its use, an extensive display is required for the user, such as, for example, the four line display in the Secoder standard, the full number of keys will not be superimposed on the touch-sensitive screen, but a more or less greatly reduced number of keys; for example, in accordance with the Secoder standard an "OK" key and a "Cancel" key.

DETAILED DESCRIPTION OF THE PREFERRED EMBODIMENT

Figure 1:
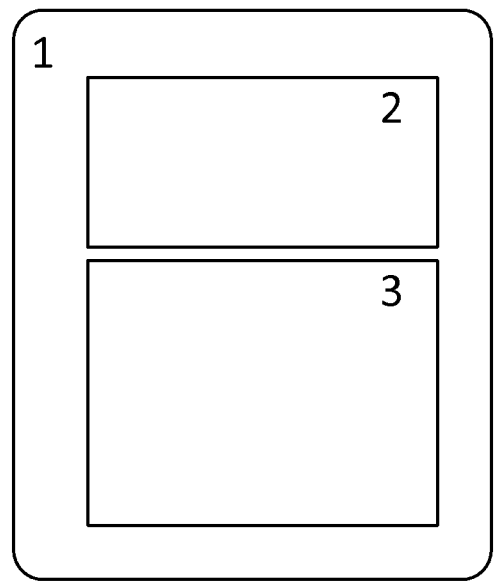
FIG. 1. a conventional depiction of a smart card reader on which the display and keyboard are two separate units.

FIG. 1. is a conventional view of a smart card reader [FIG. 1, No 1] with a display [FIG. 1, No 2] and a keyboard [FIG. 1, No 3] as separate hardware units.

Figure 2:
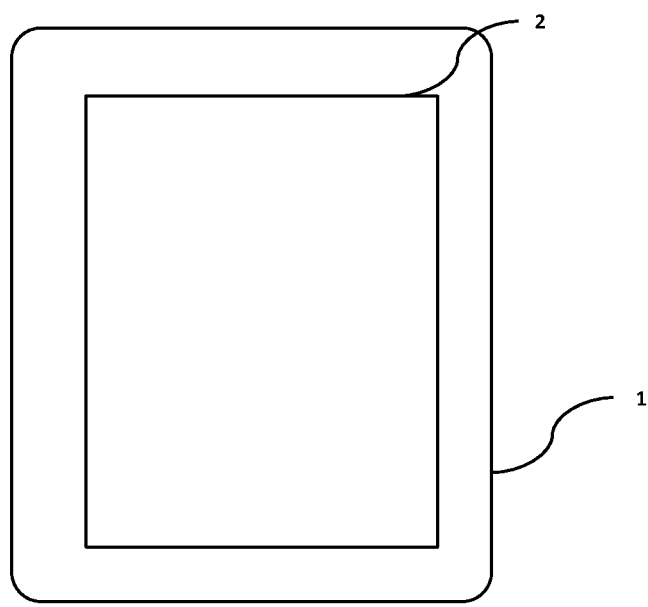
FIG. 2. a technical arrangement of the device according to the invention including a touch-sensitive screen by way of example.

FIG. 2 shows an embodiment of the device according to the invention 1 with a touch-sensitive screen 2.

Figure 2A:
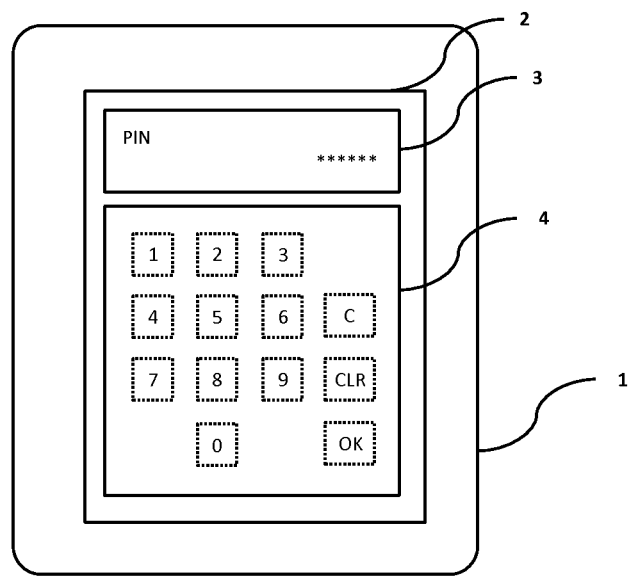
FIG. 2*a*. a technical arrangement of the device according to the invention including a touch-sensitive screen by way of example showing a display area and a keyboard area.

FIG. 2*a* shows an embodiment of the device according to the invention 1 with a touch-sensitive screen 2, which depicts an exemplary two-line display 3 for the information output and an extensive keyboard with 13 keys 4 for the information input.

Figure 2B:
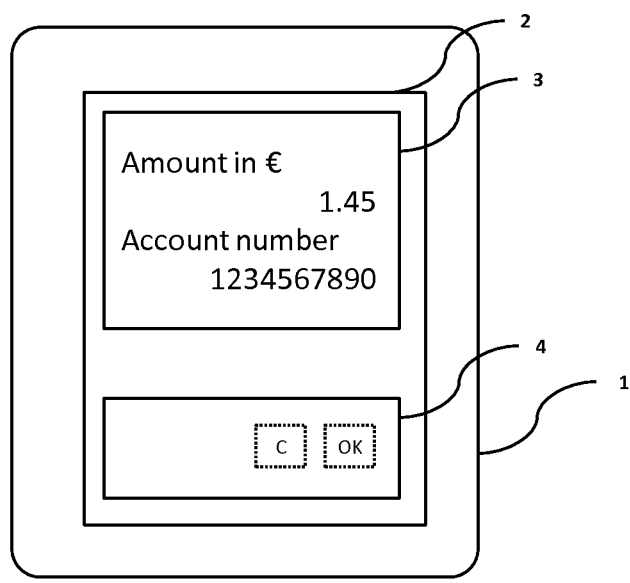
FIGS. 2*b*. and 2*c*. a technical arrangement of the device according to the invention including a touch-sensitive screen by way of example depicting another example of a display area and a keyboard area.

FIG. 2*b* shows an embodiment of the device according to the invention 1 with a touch-sensitive screen 2 depicting an exemplary four-line display 3 for the information output and a keyboard with 2 keys 4 for the information input.

Figure 2C:
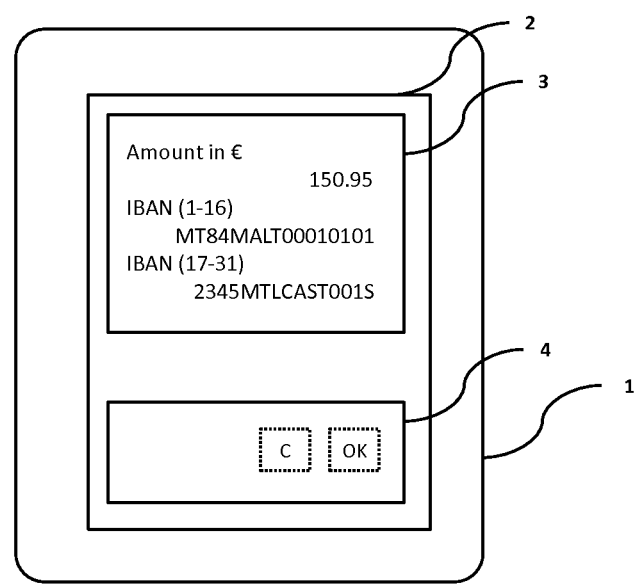

FIG. 2*c* shows an embodiment of the device according to the invention 1 with a touch-sensitive screen 2, which depicts an exemplary six-line display 3 for the information output and a keyboard with 2 keys 4 for the information input.

What is claimed is:

1. A smart card reader for controlling smart cards, comprising:
    a single touch-sensitive screen of constant dimensions and embodied so that the single touch-sensitive screen can display at least one of: information output required according to a smart card reader standard during a transaction; and a keyboard so that information required according to the smart card reader standard during the transaction can be input via the keyboard, the smart card reader being configured so that, within the constant dimensions of the touch-sensitive screen, a ratio between an area required for the information output and an area required for the keyboard to input information is dynamically adjustable depending upon whether a currently pending dialog step of the transaction requires information to be output on the display or requires information to be input on the keyboard, and
    wherein, if a larger area should be required for the information output on the touch-sensitive screen, a number of keys displayed on the touch-sensitive screen is reduced accordingly, and if, vice versa, a larger number of keys is required for the information input for the transaction or the currently pending dialog step, the area of the touch-sensitive screen for the information output is reduced accordingly to provide a dynamic partitioning.

2. The smart card reader according to claim 1, wherein the dynamic partitioning into regions for the information output and for the keyboard to input the information takes place several times during the course of the transaction.

3. The smart card reader according to claim 1, wherein the smart card reader includes one or more display units, at least one of the display units comprising the touch-sensitive screen.

4. The smart card reader according to claim 1, wherein the smart card reader includes plural keyboard units at least one of which is implemented via the touch-sensitive screen.

5. The smart card reader according to claim 1, further comprising at least a second touch-sensitive screens.

6. The smart card reader according to claim 1, wherein the smart card reader is a point of sales terminal, a secoder terminal and/or a smart card reader class 3 or a smart card reader class 4.

* * * * *